May 20, 1952 R. RITTER ET AL 2,597,673
SELF-LEVELING BEAN AND PEA HARVESTER
Filed Jan. 30, 1947 6 Sheets-Sheet 5
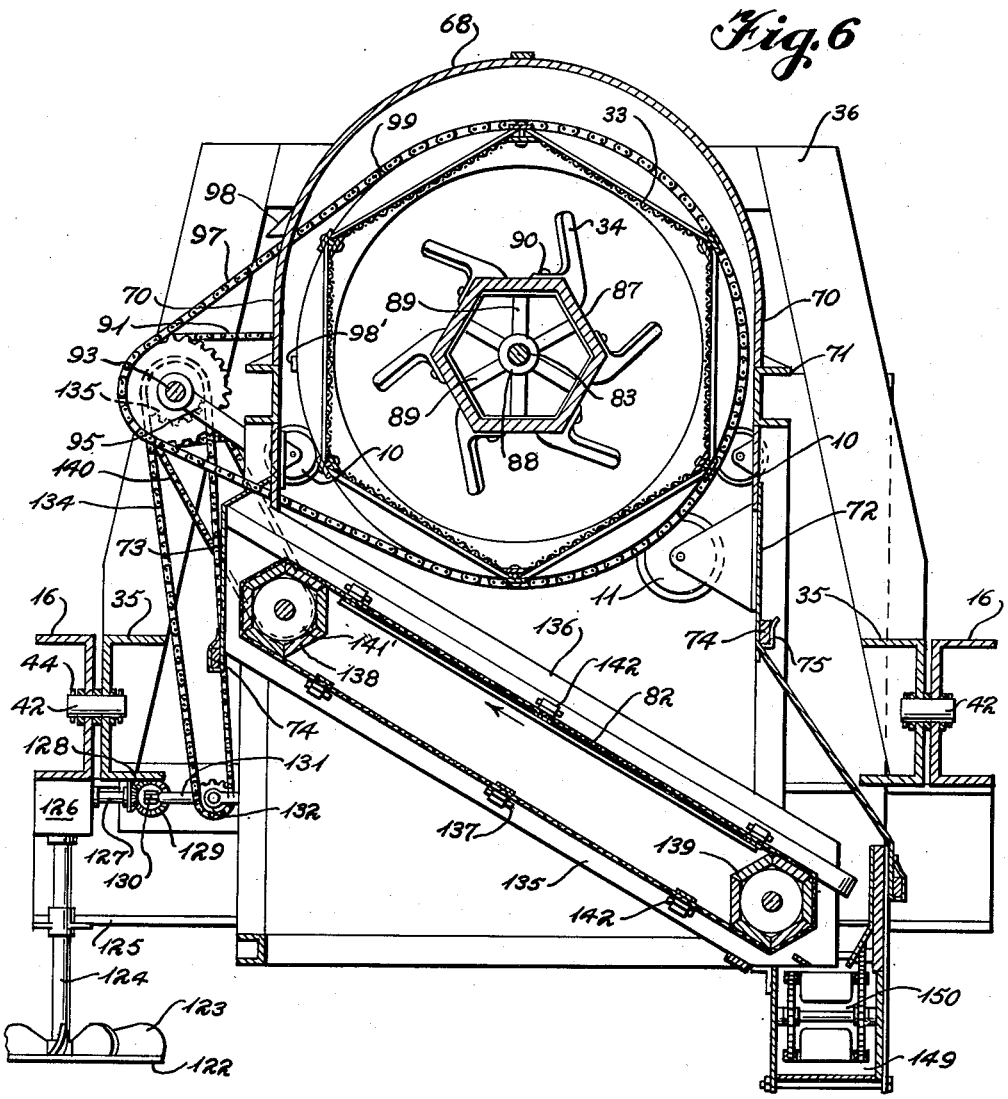
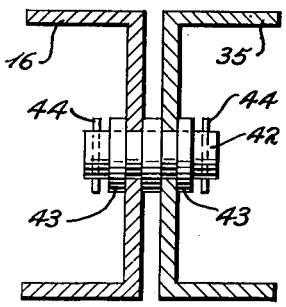
Inventor
Roy Ritter and
William Ritter May 20, 1952 R. RITTER ET AL 2,597,673
SELF-LEVELING BEAN AND PEA HARVESTER
Filed Jan. 30, 1947 6 Sheets-Sheet 6
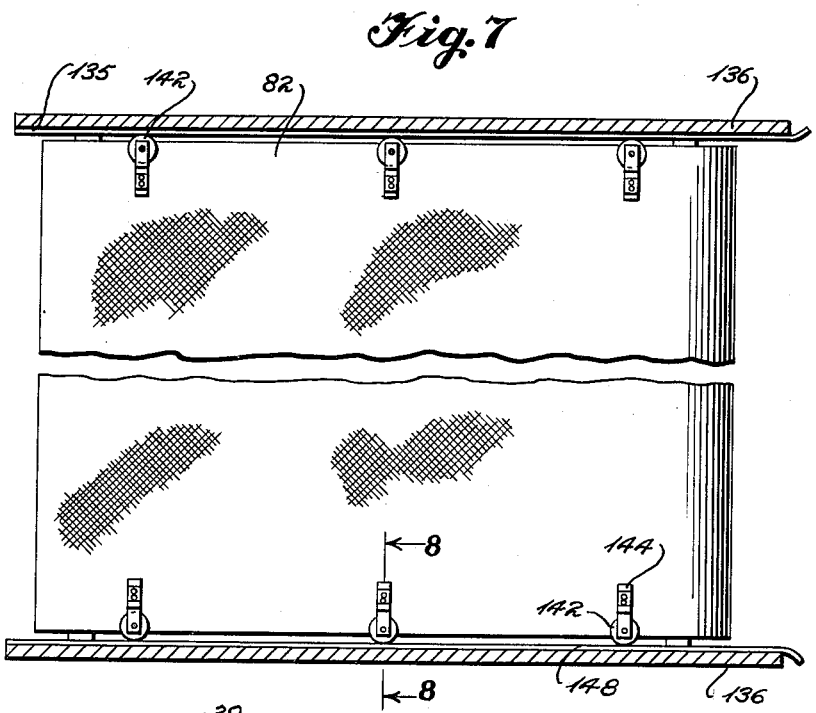
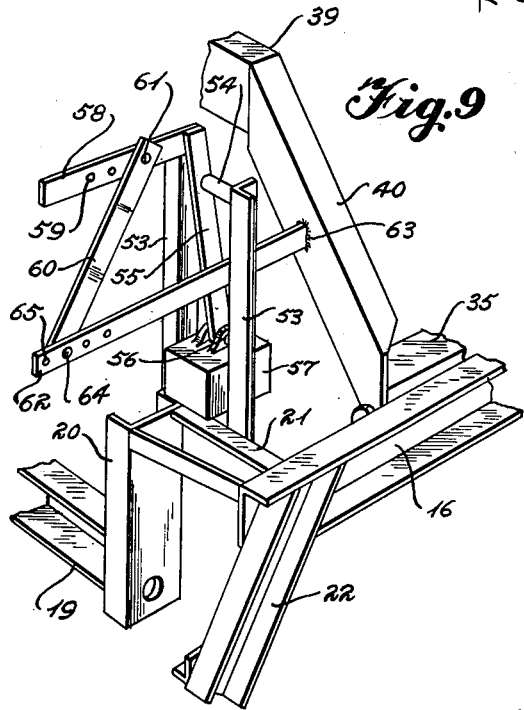
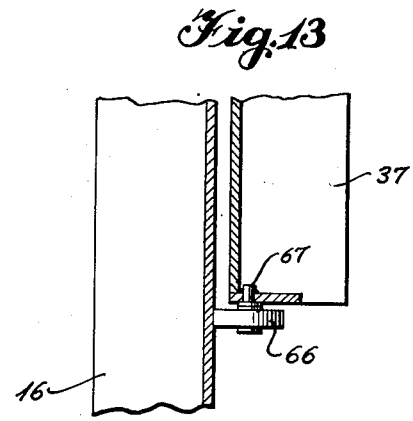
Inventor
Roy Ritter and
William Ritter Patented May 20, 1952

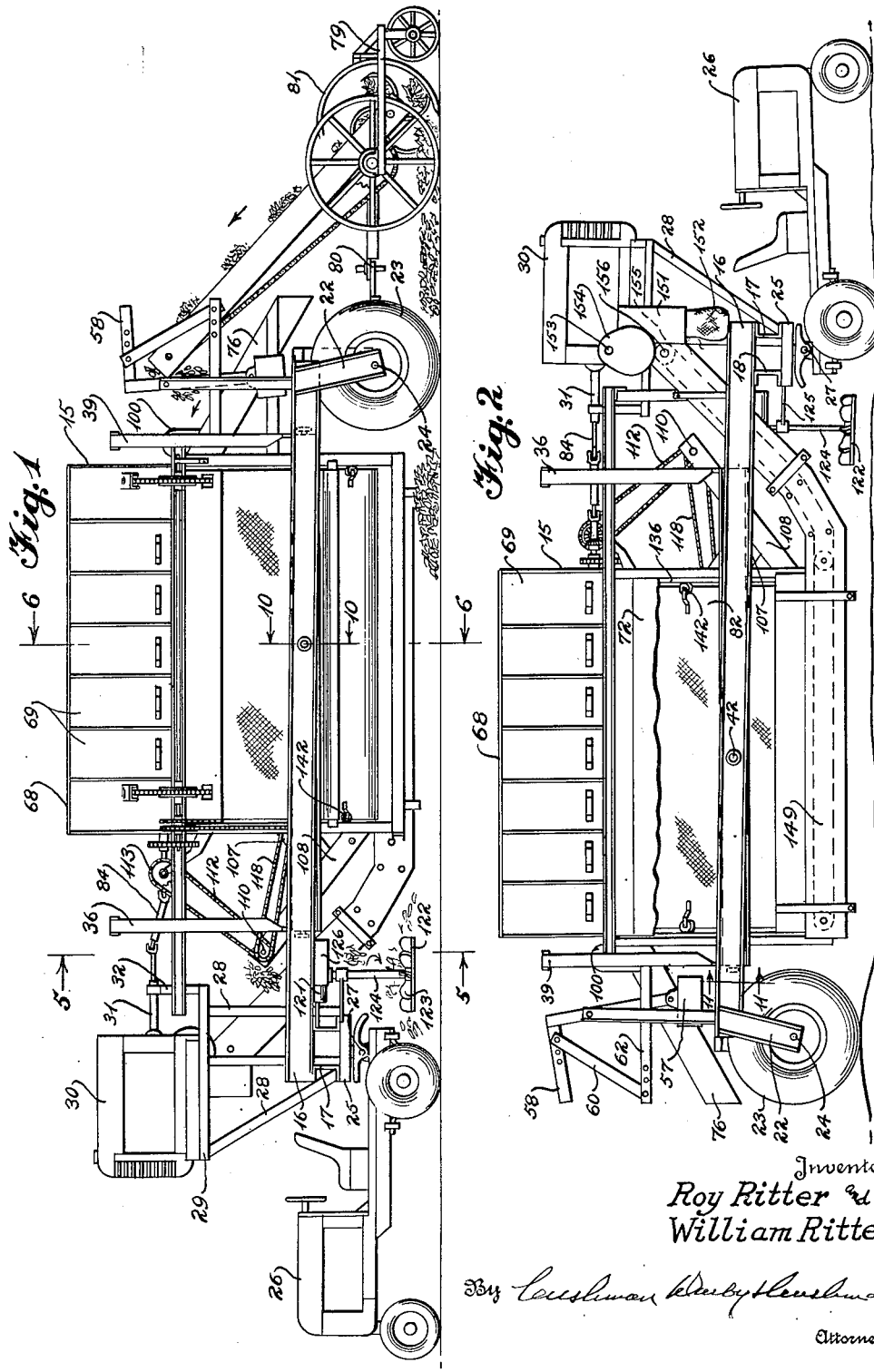
May 20, 1952 R. RITTER ET AL 2,597,673
SELF-LEVELING BEAN AND PEA HARVESTER
Filed Jan. 30, 1947 6 Sheets-Sheet 1
Inventor
Roy Ritter and
William Ritter

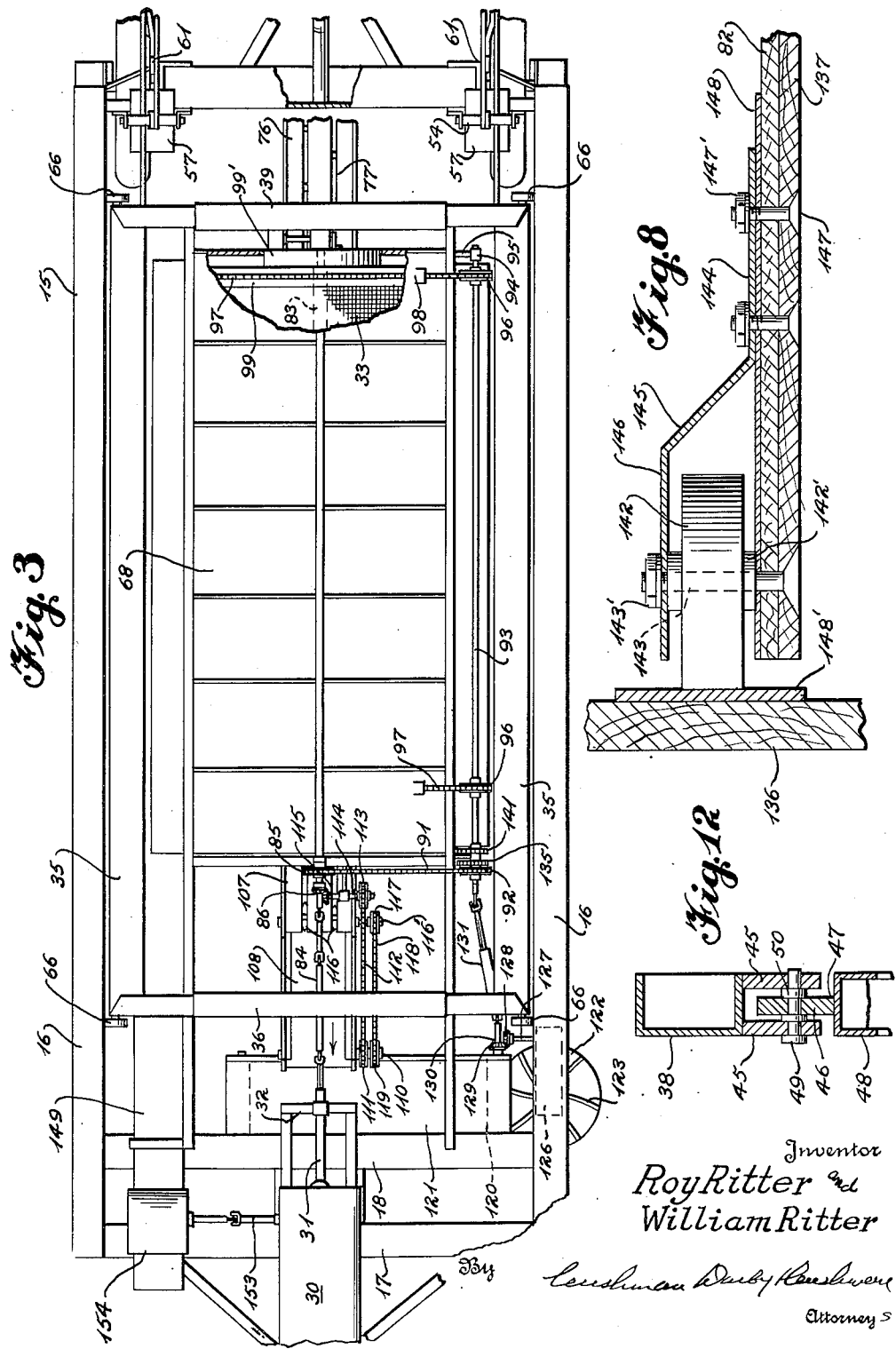

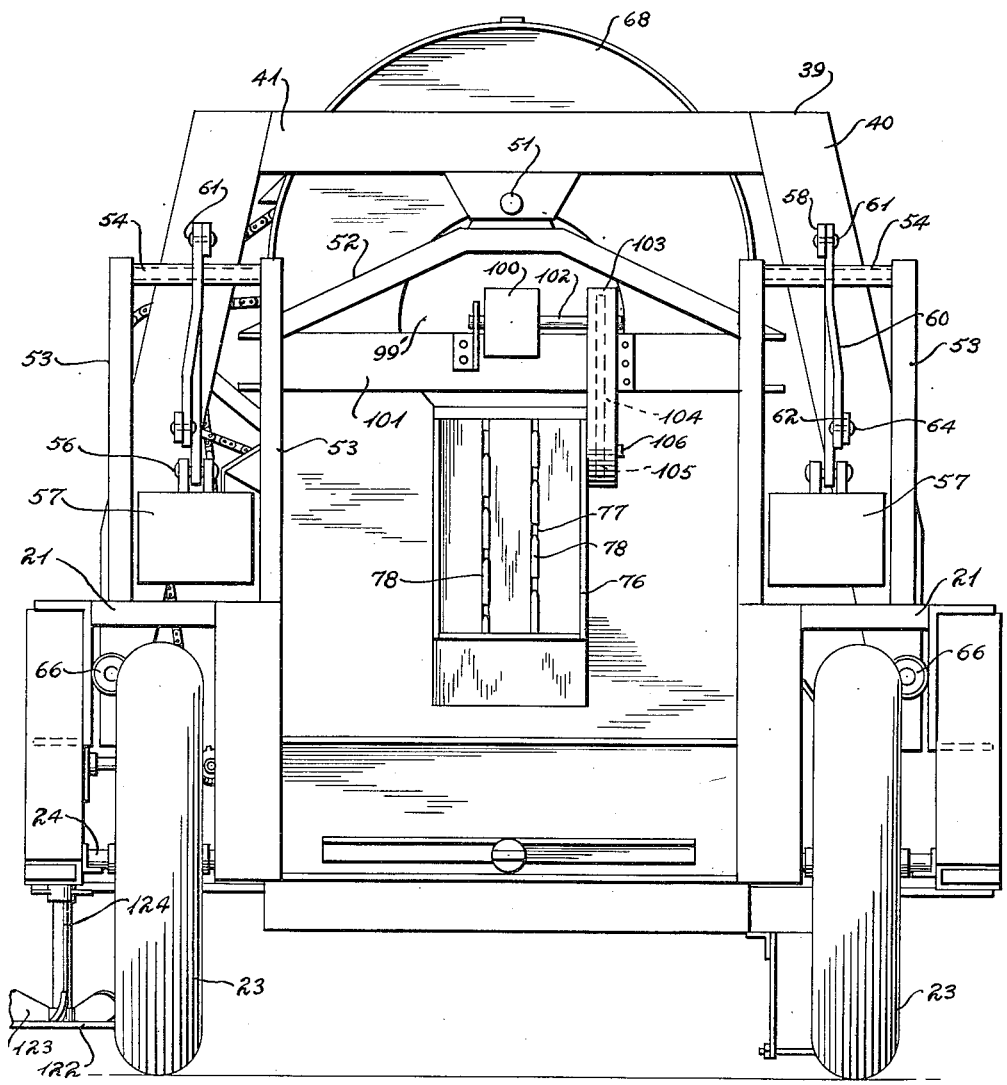

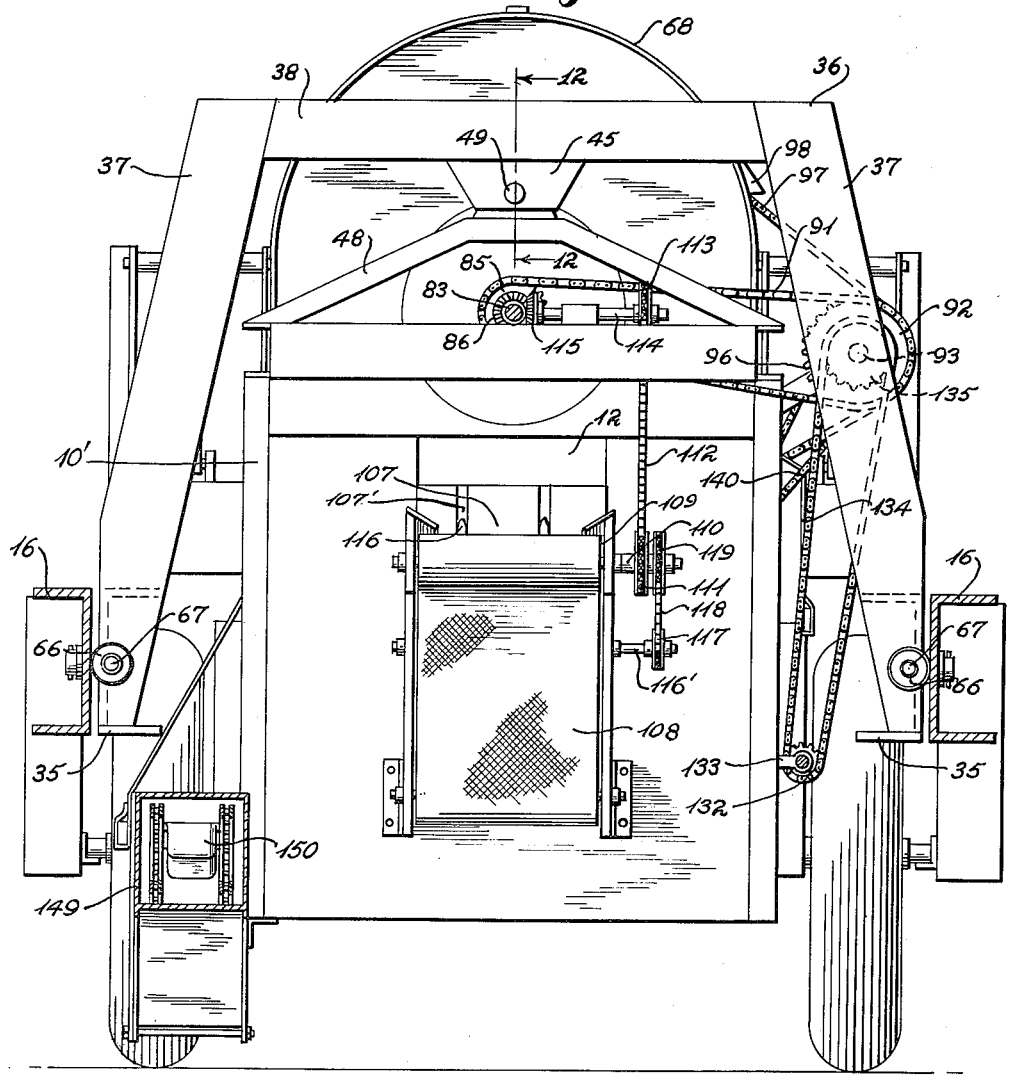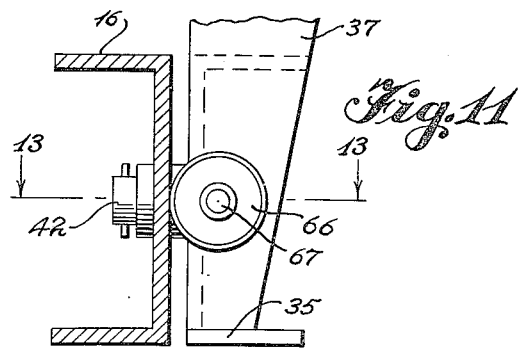

2,597,673

UNITED STATES PATENT OFFICE 2,597,673

SELF-LEVELING BEAN AND PEA HARVESTER

Roy Ritter and William Ritter, Lewes, Del.

Application January 30, 1947, Serial No. 725,212

4 Claims. (Cl. 130—30)

The present invention relates to an improved harvester and, more particularly to a vine huller machine for collecting the vines and separating the beans, peas or similar products from the vines and pods, as the machine is being driven over a field in which the crop is planted.

One of the important features of the invention is to simplify and facilitate the separation of the beans and peas from the vines in an economical and efficient manner, and consists in mounting the viner threshing machine on a tractor or the like, and providing means for collecting the vines and feeding them to the rotary sieve drum and the hulling beaters, as the machine is moved between rows of the vines or bushes growing in the field. The liberated beans as they fall through the sieve drum are conducted by a separating conveyor to a suitable receptacle carried by the machine, while the vines and open pods are discharged from the sieve drum onto a rotary blade member which spreads and distributes the vines on the ground. In order to maintain the sieve drum, hulling beaters and the inclined separating conveyor substantially level or in their proper operative positions, when the machine is traveling up or down a hill or over uneven ground, stabilizing or balancing means are provided for maintaining these parts substantially level and thus insure maximum efficiency and thorough separation of the beans from their pods during the operation of the machine. The complete hulling operation is economically effected simultaneously with the collecting of the vines and the separation of the beans, and without the added labor and expense of transporting the vines to a stationary viner as heretofore has been the custom.

A further object consists in associating with the mobile viner below the sieve drum and transversely of the machine, a conveyor frame having spaced side members, and an inclined endless apron movably mounted on the conveyor frame and provided with guide means in the form of longitudinally disposed rollers positioned above the apron and extending outwardly from the side edges thereof so as to engage the side walls of the conveyor frame to prevent wearing contact of the edges of the apron with the side members and thus prolong and materially enhance the use of the endless apron conveyor.

Other objects and advantages of the invention will become apparent from the following description when taken in conjunction with the accompanying claims and drawings.

Referring to the drawings in which is shown a preferred embodiment of the invention, Figure 1 is a side view of a viner machine constructed in accordance with the invention and shown connected to a tractor and a loading device.

Figure 2 is a side view taken from the side opposite of Figure 1, with the loading device removed.

Figure 3 is an enlarged detail plan view of Figure 1.

Figure 4 is an enlarged rear end view of Figure 2.

Figure 5 is an enlarged sectional view taken substantially along the line 5—5 of Figure 1.

Figure 6 is a sectional view taken substantially along the line 6—6 of Figure 1.

Figure 7 is a detail sectional plan view of the inclined separating apron and its associated parts provided with guide means for reducing wear on opposite edges of the apron and for preventing tearing of the apron.

Figure 8 is an enlarged detail sectional view taken substantially along the line 8—8 of Figure 7.

Figure 9 is an enlarged detail perspective view showing one of the counterbalancing means and its connection to the frame members of the viner.

Figure 10 is a detail sectional view taken substantially along the line 10—10 of Figure 1.

Figure 11 is an enlarged detail sectional view taken substantially along the line 11—11 of Figure 2.

Figure 12 is a sectional view taken substantially along the line 12—12 of Figure 5.

Figure 13 is a sectional view taken substantially along the line 13—13 of Figure 11.

Referring to the drawings in which like numerals indicate like parts in the several views, 15 designates the improved mobile viner threshing machine and includes an outer main frame comprising longitudinally extending spaced side angle bars or beams 16 which at their forward ends are connected by a pair of transverse spaced bars 17 and 18 (Figure 3) and at their rear ends to a transverse bar 19 (Figure 9) by vertical bars 20 and lateral bars 21. The rear of the frame is also provided at each end of the bars 16 with an inclined bar 22 which co-acts with the bar 20 to form a pair of bearing supports for the rear wheels 23 and their stub axles 24. The front transverse bars 17 and 18 rest on a metal flat plate 25 that may be detachably connected to a tractor or the like 26 as at 27 (Figure 1). Extending upwardly from the plate 25 are spaced arms 28 that carry a platform 29 on which is mounted a motor 30 having an operating shaft 31 supported by a bearing 32 (Figure 3) that extends upwardly from the platform 29.

In order that the parts of the viner machine may be maintained substantially level and in proper operative positions as the machine is moved over the field during the vining operation, the sieve or screen drum 33, the rotary hulling beaters mounted in the drum, and their associated parts are supported by a stabilizing or balancing inner frame or cradle comprising spaced side angle bars 35 normally disposed substantially parallel and within the outer side bars 16. The bars 35 at their forward ends are connected together by a cross member 36 that may be formed with a pair of upwardly inclined portions or arms 37 and a horizontal transverse portion 38 (Figure 5). At their rear ends the bars 35 are connected by a cross member 39 having a pair of spaced upwardly inclined portions 40 and a transverse horizontal portion 41. The parts of the outer and inner frames may be welded together or otherwise connected to form a rigid durable structure capable of withstanding the weight and pressure to which they are subjected. The bars 35 of the inner frame are spaced from the outer bars 16 and are pivotally connected to these bars intermediate their ends by the bolts or pins 42 which may be provided with the spacer rings or washers 43 (Figure 10) and the locking pins 44. The front cross member 36 of the inner frame has depending centrally from the horizontal portion 38 thereof, a pair of spaced lugs 45 (Figure 12) into which extends an upwardly projecting arm 46 welded or otherwise secured as at 47 to a transverse supporting frame structure 48 mounted on the machine frame 10' of the viner (Figure 5). A pivoted pin 49 extends through aligned openings in the lugs 45 and arm 46 and may carry spacer rings 50. Similarly, the rear cross member 39 is pivotally connected as at 51 (Figure 4) to a transverse supporting structure 52 carried by the machine frame 10'. The spaced pivotal connections 49 and 51 are in longitudinal alignment and preferably located above the pivot pins 42, so as to provide means for rocking or tilting the outer frame and its associated parts laterally relative to the inner frame during the operation of the machine. Thus the pivotal connections 42 co-act with the pivotal connections 49 and 51 to provide means supporting the inner frame that allows vertical movement and also rotative movement of the outer frame without disturbing the horizontal or level position of the inner frame and its associated parts.

A pair of spaced angle bars 53 extend upwardly from each of the bars 21 at the rear end of the outer frame (Figure 9), and at their upper ends, carry a transverse rockable shaft 54 to which is fixed a link 55 that is pivoted as at its lower end as at 56 to a weight 57. A horizontal arm 58 welded or otherwise secured to the upper end of the link 55 extends outwardly therefrom and may be provided with a series of spaced openings 59 for detachably receiving an inclined arm 60 that carries a bolt 61 which adjustably connects the arm 60 to the arm 58. Extending outwardly from each of the side portions 40 of the transverse member 39 is an arm 62 which may be welded as at 63 to the cross member 39 and is positioned below the arm 58. The lower end of the inclined arm 60 carries a bolt 64 arranged to be inserted in any one of a series of openings 65 in the arm 62 so as to co-act with the bolt 61 for varying the adjustment of each of the weights 57 in order to maintain a proper counterbalancing between the main outer frame and the inner frame upon longitudinal displacement of the machine when going up or down a hill or passing over rough ground.

The depending inclined portions 37 and 40 of the front and rear cross members 36 and 39 extend downwardly in overlapping relation with the adjacent sides of the angle bars 16 (Figure 5) and each of these side portions has journalled thereto rollers 66 as at 67 which extend outwardly and frictionally engage the sides of the bars 16 so as to prevent lateral swinging movement of the inner frame.

The sieve or wire screen drum 33 may be enclosed in a fixed casing or housing 68 which may be of curved shape as shown in Figure 6 and formed of a plurality of interconnected sections 69 (Figure 1). The housing 68 has spaced depending sides 70 (Figure 6) which may be secured to longitudinally extending angle bars 71 on the machine, and may also be provided with flexible curtains 72 and 73 for preventing the discharge of material from the sides of the machine when the latter is in operation. Each of the curtains 72 and 73 at its lower end may carry a longitudinal bar 74 arranged to be detachably received in a yieldable clamp 75 for maintaining the curtains in their lower closed positions. The rear end of the viner has an inclined chute 76 in which may be mounted a pair of endless chains 77 (Figure 4) that carry upwardly projecting teeth 78 and which are operated by the motor 30 in a manner which will subsequently be described. A vine loader 79 is arranged to be detachably connected to the rear of the machine as at 80 and may have means such as the teeth or forks 81 for picking up and transferring the vines with the pods attached, to the receiving chute 76 from where the vines are discharged into the rotary sieve drum 33 so as to be acted on by the huller beaters 34 in order to break the pods and liberate the beans. The openings in the sieve drum are sufficient to allow the beans to fall therethrough, onto an inclined separating apron 82 which extends transversely of the machine and beneath the sieve drum 33.

Extending longitudinally and centrally through the sieve drum 33 is a revoluble shaft 83 that is operatively connected to the drive shaft 31 of the motor 30 through a flexible universal joint shaft assembly 84 (Figure 3). The outer end of the shaft 83 extends forwardly of the housing 68 and carries a sprocket wheel 85 and a bevel gear 86. The huller blades 34 may be connected to a hexagonal-shaped beater drum 87 (Figure 6) that has a central bearing sleeve 88 which is keyed or otherwise secured to the shaft 83 and is connected to the outer wall of the drum 87 by the radial arms 89. The blades 34 may be connected to the outer surface of the beater drum 87 by the bolts 90. The revoluble sieve drum 33 is supported in the machine by the rollers 10 and the auxiliary or bearing rollers 11 (Figure 6) suitably connected to the sides of the outer frame at each end thereof so as to engage the outer lower surface of the sieve drum 33. The drum 33 is rotated in the same direction as the hulling blades 34 through the sprocket wheel 85 on the shaft 83, which is connected through the endless chain 91 to a sprocket wheel 92 on the countershaft 93. The shaft 93 is journalled in bearings 94 of the brackets 95 that extend outwardly from one side of the machine. Spaced sprocket wheels 96 on the shaft 93 are connected to endless chains 97 which extend through suitable spaced openings 98 in the housing 68 and engage lugs or sprocket teeth 98' on the heads 99 of the drum 33, (Figure 6) so as to rotate the latter in the same direction as the huller blades 34 but at slower speed. The rear end of the shaft 83 extends through a central opening 99' at the rear of the drum 83, (Figure 3) into a gear box 100 (Figure 4) carried by a cross bar 101. A shaft 102 extends outwardly from one side of the gear box 100 and carries a sprocket wheel 103 which is connected through an endless chain 104 with a sprocket wheel 105 operatively connected to a shaft 106 that operates the teeth 78 in the chute 76 for feeding the vines from the loader 79 into the sieve drum. The vines and pods after removal of the beans therefrom, are discharged through a central opening 12 at the front of the drum 33 onto a downwardly inclined chute 107 and onto an upwardly inclined endless conveyor 108 (Figure 5) which at its upper end has a drive roll 109 connected to a transverse shaft 110 that is operatively connected through a sprocket wheel 111 thereon, and an endless chain 112, to a sprocket wheel 113 on a transverse shaft 114 that is connected through the bevel gear 115 with the complementary bevel gear 86 on the drive shaft 83. The inclined chute 107 may be provided with spaced longitudinal openings 107' (Figure 5) through which extend rotatable teeth 116 that are keyed to a transverse shaft 116' (Figure 3). The shaft 116' extends beneath the conveyor 107 and is operatively connected through a sprocket wheel 117, chain 118 and sprocket wheel 119 to the shaft 110. The teeth 116 act to loosen and separate the vines as they are discharged from the sieve drum and transferred to the conveyor 108. Associated with the upper end of the conveyor 108 and positioned transversely thereof is an endless conveyor 121 (Figure 3) that is arranged to conduct the vines and tailings to one side of the machine and above a rotary spreader or disk 122 that is provided with upwardly projecting blades 123 and a vertical shaft 124 journalled in a bracket bearing 125 (Figure 6).

The shaft 124 extends into a gear box 126 (Figure 6) and is operatively connected to a horizontal shaft 127 projecting outwardly from one side of the gear box 126. The shaft 127 carries a bevel gear 128 that meshes with a complementary bevel gear 129 carried by shaft 130 which also drives the roller 120 of the conveyor 121. The shaft 130 is connected through a flexible universal shaft assembly 131 (Figure 3) with a sprocket wheel 132 which is carried by a bracket 133 that extends from one side of the outer frame below the countershaft 93 (Figure 6). An endless chain 134 connects the sprocket wheel 132 with a sprocket wheel 135 on the countershaft 93 so as to impart movement to the transverse conveyor 121 and the spreader 122 from the motor 30.

The inclined separating apron 82 beneath the drum 33 may be positioned within a conveyor frame 135 having spaced vertically disposed inclined sides 136 (Figure 7) of such a length as to completely extend across the machine. The apron 82 which may be made of canvas or other suitable material is substantially the same width as the length of the screen drum 33 and is supported by a series of transverse slats 137 which are substantially the same width as the apron and of slightly narrower width than the conveyor chute 135 (Figure 8). The apron 82 travels upwardly around polygonal shaped rollers 138 and 139 journalled in the conveyor frame 135 and is driven from the countershaft 93 through an endless chain 140 (Figure 5) connected at its upper end to a sprocket wheel 141 on the shaft 93 (Figure 3), and at its lower end to a sprocket 141' that in turn is operatively connected to the upper roller 138 (Figure 6).

Secured to each of the transverse slats 137 above the endless apron 82 and adjacent the ends of the slats, are guide means in the form of horizontally disposed rollers 142 which may have ball bearings. Each of the rollers 142 is journalled on a vertical shaft or threaded bolt 143 that extends upwardly through the slat 137 and the apron 82 (Figure 8). The upper or free end of the bolt 143 is supported by a retaining member 144 having an inclined portion 145 and an outwardly extending horizontal or offset portion 146 provided with an opening through which extends the bolt 143 so as to receive a threaded nut 143'. The retaining member 144 may be provided with spaced openings for receiving the threaded bolts 147 which extend through the slat 137 and the apron 82, and are secured in position by the nuts 147'. A metal plate 148 may be interposed between the top of the apron 82 and each of the retaining members 144, and the roller 142 may be spaced from the retaining member 144 and the apron, by the rings or washers 142'. The rollers 142 extend outwardly from the side edges of the apron 82 and the slats 137 so as to contact with metal wearing plates 148' carried by the side members 136.

Due to the extent of the width of the separating apron 82, it has heretofore been extremely difficult to prevent creeping of the apron to one side or the other or to provide means which would maintain the apron flat and smooth during the operation of the machine. In fact under ordinary operating conditions the life of these separating aprons is about two days. At the end of this time, the apron has been so worn and torn as to require replacement by a new apron. The cost of replacing and installing a new separating apron every other day is quite expensive. By providing the guide rollers 142 for maintaining the apron substantially flat and out of contact with the sides of the conveyor frame, the life of the apron is materially increased and it has been found that a single apron will last a complete operating season without having to be replaced.

As the beans liberated from the pods in the sieve drum 33 and chaff fall onto the conveyor 82 the beans fall downwardly into a trough 149 extending longitudinally along one side of the viner and in which is mounted an endless bucket conveyor 150 that transfers the beans upwardly to a discharge point 151 (Figure 2) above a bag or other suitable receptacle 152, that receives the beans. The chaff and dirt are carried upwardly by the separating apron 82 and discharged from the upper end thereof onto the ground. The motor 30 has projecting outwardly from one side thereof, a flexible universal shaft assembly 153 (Figure 3) which extends into a gear box 154 above the forward end of the trough 149. Within the gear box 154 means are provided for operatively connecting the shaft 153 to a drive roller 155 journalled to a shaft 156 at the upper end of the trough and to which the endless conveyor 150 is connected so as to be driven by the motor 30.

In operation, it might first be mentioned, that lima beans are sown in rows and are usually harvested by cutting the bush or vine, and collecting the bushes and transferring them with the pods attached, to a viner. Assuming that the machine is used to collect lima beans in the field when the beans have reached maturity, it will be seen that as the machine is moved along the ground either by the tractor 26 or other suitable propelling means, that the loader 79 picks up and transfers the vines into the sieve drum 33 where the pods are acted on by the beaters 34 to liberate the beans. As the sieve drum 33 and huller blades 34 are driven through the operative connection of the shaft 83 with the motor 30 and in the same direction but at different speeds, the beans and chaff fall through the drum onto the endless apron 82 where the beans drop into the trough 149 and are transferred to the bag 152 by the conveyor 150. The shape of the rollers 138 and 139 which carry the apron 82 imparts a steady agitation to the apron so as to insure separation of the beans from the chaff and dirt. The bag 152 is conveniently positioned so that as soon as it is filled it may be removed from the machine and an empty bag positioned in its place. The treated vines, open pods, and tailings are discharged from the forward end of the drum 33 through the opening 12 (Figure 5) where they are loosened by being brought into contact with the teeth 116 prior to being transferred to the upwardly inclined conveyor 108. The vines and pods are discharged from the conveyor 108 onto the transverse conveyor 121 (Figure 3) that has its discharge end positioned above the spreader 122 so that the vines and pods as they fall on the spreader are thrown outwardly onto the ground by the blades 123. It will be observed that that motor 30 is operatively connected to the spaced teeth 78 in the inclined receiving chute 76 through the gear box 100 and its associated parts (Figure 4), and likewise is operatively connected to the teeth 116 in the chute 107 and the upwardly inclined conveyor 108 through the shaft 83 and the gear assembly as particularly shown in Figure 5. Additionally the motor 30 is connected through the countershaft 93, endless chain 134 (Figure 6) and the gear 132 and its associated parts, with the transverse conveyor 121 and the spreader 122. The motor 30 is also connected to the endless bucket conveyor 150 in the trough 149 through the flexible shaft assembly 153 (Figure 3). In other words, as the viner is being moved along the ground by the tractor 26 and while the motor 30 is in operation, means are provided for feeding the vines with the pods attached, into the screen drum 33 where the beans are separated from the vines and pods and delivered to the receptacle 152, at the same time as the machine is collecting the vines and feeding them into the screen drum 33. Simultaneously with this operation the vines and opened pods are being discharged from the screen drum and distributed along the ground, without any interruption to the operation of the machine.

It will be noted that the balancing or stabilizing means produced by the central and end pivotal connections of the inner and outer frames, permits the inner frame which supports and carries the sieve drum, huller beaters, and separating apron, to maintain these parts level or in proper operative position irrespective of the unevenness of the ground over which the machine is traveling (Figure 2). The counterbalancing means 57 co-act with the transverse central pivot pins 42 to maintain the viner and its associated parts level length-wise when the tractor passes up or down a hill or over uneven ground, and may be adjusted as working conditions may require. The counterbalancing means also serve to insure a steady feed of the vines from the conveyor 76 into the sieve drum when the tractor is going down or up a hill, and acts to return the main frame to its normal position when it has been displaced. The engagement of the rollers 66 on the ends of the inner frame with the outer bars 16 prevent lateral swinging movement of the inner frame when the machine is in operation. The central pivotal supports 49 and 51 for the inner frame constitute a transverse balance during the operation of the viner and insure the inclined separating apron 82 being maintained at all times at the proper angle of inclination. It will be manifest if the apron 82 were not maintained at the proper angle, that upon tilting or rocking of the machine, there would be a tendency for the beans to discharge from the upper end of the conveyor with the chaff and dirt rather than fall down the inclined apron into the receiving trough 149.

Thus, it will be seen that simple, efficient, and economical means are provided for expeditiously collecting beans, peas and similar products in the field and at the same time separating or assorting the beans from the vines and pods in a continuous operation and in such a manner as to obtain maximum recovery of the beans at the expenditure of minimum cost of time and labor. Manifestly the viner machine may be used with equal efficiency for collecting and separating green peas and similar products by the simple expedient of reducing or varying the size of the openings in the sieve drum 33. The separating apron 82 and the guide rollers 142 may be associated with a stationary viner or other machine in which the apron is used to assort different articles or material.

It will be understood that the form of the invention shown and described is merely illustrative of a preferred embodiment and that such changes may be made as fall within the purview of one skilled in the art without departing from the spirit of the invention and the following claims.

We claim:

1. A mobile vine hulling machine for collecting the vines and separating the beans or peas from the vines and pods as the machine is moved over a field, said machine including in combination, an outer supporting frame having spaced longitudinally extending side bars, an inner frame having side bars associated with the side bars of the outer frame, the side bars of the frames intermediate their ends having transversely aligned means pivotally connecting the inner side bars to the outer side bars, cross members above said frames and having depending end portions fixed to the ends of the inner frame, said machine having a machine frame positioned within said inner and outer frames, means pivotally connecting the cross members centrally to the opposite ends of the machine frame to allow relative lateral rocking movement between the machine and the inner frame, and means operatively associated with the inner frame for maintaining the same substantially level upon displacement of the outer frame when the machine passes over uneven ground.

2. A mobile vine hulling machine for collecting the vines and separating the beans or peas from the vines and pods as the machine is moved over a field, said machine including in combination, an outer supporting frame having spaced longitudinally extending side bars, an inner frame having side bars associated with the side bars of the outer frame, the side bars of the frames intermediate their ends having transversely aligned means pivotally connecting the inner side bars to the outer side bars, cross members above said frames and having depending end portions fixed to the ends of the inner frame, means pivotally connecting the cross members centrally to the machine above the pivotal connection of the side members to allow relative lateral rocking movement between the machine and the inner frame, said depending end portions being provided with anti-friction roller means engaging the inner walls of the side bars of the outer frame, and means operatively associated with the inner frame for maintaining the same substantially level upon displacement of the outer frame when the machine passes over uneven ground.

3. A mobile vine hulling machine for collecting the vines and separating the beans or peas from the vines and pods as the machine is moved over a field, said machine including in combination, an outer supporting frame having spaced longitudinally extending side bars, an inner frame having side bars associated with the side bars of the outer frame, the side bars of the frames intermediate their ends having transversely aligned means pivotally connecting the inner side bars to the outer side bars, cross members fixed to the ends of the inner frame and extending upwardly between the side bars of the outer frame, means pivotally connecting the cross members centrally to the machine above the pivotal connection of the side bars to allow laterally rocking movement between the machine and the inner frame, a sectional drive shaft extending longitudinally of the machine and centrally of said frame, hulling beaters keyed to said shaft and positioned within said inner frame, a sieve drum enclosing said hulling beaters and revolubly mounted on said shaft, driving means operatively connected to the drive shaft and the sieve drum for rotating the same during the operation of the machine, and an inclined separating conveyor beneath the drum for receiving the liberated beans or peas as they fall through the drum, the pivotal connection between the inner and outer frames constituting means for maintaining the sieve drum and hulling beaters in substantially a horizontal position and the separating conveyor at a fixed angle of inclination when the machine passes over uneven ground.

4. A mobile vine hulling machine for collecting the vines and separating the beans or peas from the vines and pods as the machine is moved over a field, said machine including in combination, an outer supporting frame having spaced longitudinally extending side bars, an inner frame having side bars associated with the side bars of the outer frame, the side bars of said frame intermediate their ends having transversely aligned means pivotally connecting the inner side bars to the outer side bars, cross members fixed to the ends of the inner frame and extending upwardly between the side bars of the outer frame, means pivotally connecting the cross members centrally to the machine above the pivotal connection of the side members to allow laterally rocking movement between the machine and the inner frame, a drive shaft extending longitudinally of the machine and centrally of said frame, hulling beaters keyed to said shaft and positioned within said inner frame, a sieve drum enclosing said hulling beaters and revolubly mounted on said shaft, an inclined separating conveyor beneath the drum for receiving the liberated beans or peas as they fall through the drum, and driving means operatively connected to the drive shaft, the sieve drum and the inclined separating conveyor for rotating the same during the operation of the machine, the pivotal connection between the inner and outer frames constituting stabilizing means for maintaining the separating conveyor at a fixed angle of inclination when the machine passes over uneven ground.

ROY RITTER.
WILLIAM RITTER.

REFERENCES CITED

The following references are of record in the file of this patent:

UNITED STATES PATENTS

| Number | Name | Date |
| --- | --- | --- |
| 32,429 | Martin | May 28, 1861 |
| 366,242 | Parnell | July 12, 1887 |
| 509,082 | Heald | Nov. 21, 1893 |
| 645,228 | Laswell | Mar. 13, 1900 |
| 750,367 | Jahraus | Jan. 26, 1904 |
| 776,167 | Best | Nov. 29, 1904 |
| 795,672 | Willms | July 25, 1905 |
| 894,439 | Hoveland | July 28, 1908 |
| 1,035,184 | Hamacheck | Aug. 13, 1912 |
| 1,153,304 | Hamacheck | Sept. 14, 1915 |
| 1,192,124 | Scott | July 25, 1916 |
| 1,212,486 | Coil | Oct. 24, 1916 |
| 1,257,058 | Williams | Feb. 19, 1918 |
| 1,405,312 | Miller | Jan. 31, 1922 |
| 1,627,354 | Thorsten | May 3, 1927 |
| 1,899,766 | McWilliams | Feb. 28, 1933 |
| 2,037,300 | Arbuckle | Apr. 14, 1936 |
| 2,213,387 | DeBack | Sept. 3, 1940 |
| 2,251,655 | Bostic | Aug. 5, 1941 |
| 2,504,289 | Waterman | Apr. 18, 1950 |